US012784039B2

(12) United States Patent
Patra et al.

(10) Patent No.: US 12,784,039 B2
(45) Date of Patent: Nov. 3, 2026

(54) METHOD AND SYSTEM FOR PRIVATE TRANSACTION PROCESSING

(71) Applicant: MASTERCARD INTERNATIONAL INCORPORATED, Purchase, NY (US)

(72) Inventors: Ram Patra, Dublin (IE); Thomas Treitlinger, Dublin (IE); Rakesh Yadav, Cape Elizabeth, ME (US); Damien Conroy, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 14 days.

(21) Appl. No.: 19/185,880

(22) Filed: Apr. 22, 2025

(65) Prior Publication Data

US 2025/0265582 A1 Aug. 21, 2025

Related U.S. Application Data

(63) Continuation of application No. 17/453,402, filed on Nov. 3, 2021, now Pat. No. 12,307,449.

(51) Int. Cl.
*G06Q 20/38* (2012.01)
*G06Q 20/36* (2012.01)

(52) U.S. Cl.
CPC ......... *G06Q 20/383* (2013.01); *G06Q 20/363* (2013.01); *G06Q 20/3827* (2013.01); *G06Q 2220/00* (2013.01)

(58) Field of Classification Search
CPC ............. G06Q 20/00-425; G06Q 2220/00-18
See application file for complete search history.

(56) References Cited

U.S. PATENT DOCUMENTS

2018/0240107 A1 8/2018 Andrade
2018/0293557 A1 10/2018 Kim et al.
(Continued)

FOREIGN PATENT DOCUMENTS

CN 110266655 A 9/2019
JP 3228339 U 10/2020
WO 2019194803 A1 10/2019

OTHER PUBLICATIONS

First Examination Report mailed Jul. 14, 2025 in corresponding Indian Patent Application No. 202447035012 with English Translation, 7 pages.
(Continued)

*Primary Examiner* — Mohammad A. Nilforoush
(74) *Attorney, Agent, or Firm* — Panitch Schwarze Belisario & Nadel LLP

(57) ABSTRACT

A method for facilitating secure private transfers in a blockchain includes: receiving an initiate message from a device for a proposed private transfer including a private group identifier, entity identifier, and transfer amount; executing a smart contract using the initiate message as input resulting in transmitting an event message to a central authority system including the entity identifier and transfer amount; receiving a response message from the central authority system including an indication of approval or rejection of the proposed private transfer; and executing the smart contract using the response message as input resulting in (i) adding a private blockchain transaction for transfer of the transfer amount from a first blockchain wallet associated with the entity identifier to a second blockchain wallet in a private group associated with the private group identifier if the response message includes an indication of approval, or (ii) declining the proposed private transfer.

16 Claims, 5 Drawing Sheets

(56) References Cited

U.S. PATENT DOCUMENTS

| | | | |
|---|---|---|---|
| 2019/0354989 A1 | 11/2019 | Saket et al. |
| 2020/0201846 A1 | 6/2020 | Yang |
| 2021/0091925 A1 | 3/2021 | Davis et al. |

OTHER PUBLICATIONS

International Search Report dated Feb. 14, 2023, corresponding to PCT/US2022/045488 (11 pages).

Notice of Reasons for Refusal dated Feb. 18, 2025, iussued by the Japanese Patent Office in corresponding Japanese Patent Application No. 2024-526674 (6 Pages).

METHOD AND SYSTEM FOR PRIVATE TRANSACTION PROCESSING

FIELD

The present disclosure relates to the processing of private transactions, specifically the processing of private transactions for a public blockchain with a central authority and in a secure manner without the risk of double spend using smart contracts.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

While the first blockchains were entirely public, some blockchains have been created that only allow authorized entities to participate in the blockchain. These blockchains, referred to as "permissioned" blockchains, often involve one or more entities that provide for such authorization to participants. Transactions in these blockchains are still largely public to the authorized participants, where each participant can see all of the transactions. While the transactions do not necessarily reveal the identity of each participant, as the transactions are conducted via blockchain wallets, some participants may be able to work out the identity of the other participants behind each blockchain wallet. Additionally, even in cases where identities may not be discernable, a participant may desire to keep their transaction history private, such as to avoid revealing transaction frequency or the amount of currency involved.

However, traditional blockchains lack such features. Some blockchains have been developed that feature the ability for participants to enter exclusive groups, also known as "privacy groups" where transactions conducted in such a group are only available for viewing by members of that group, as controlled by nodes in the blockchain. While this can provide for the desired privacy for participants, the complete privacy of transactions can provide the opportunity for a participant to double-spend blockchain currency, such as by simultaneously transferring the same blockchain currency in two different privacy groups. Additionally, the privacy can be in violation of regulations and create difficulties in ensuring compliance with applicable rules.

Thus, there is a need for an improvement to existing blockchain technology that can provide for private transactions between participants where unauthorized entities are unable to see the transaction data while also protecting against double spend and enabling compliance with all applicable rules and regulations.

SUMMARY

The present disclosure provides a description of systems and methods for facilitating secure private transfers in a blockchain. When a first participant in a blockchain wants to transfer currency to a second participant, an initiate message is submitted by the first participant that is used as input into a smart contract that is stored in a privacy group that includes both the first and second participant. Execution of the smart contract with the input results in an event message being transmitted to a central authority that is associated with the blockchain. The central authority maintains balances for each of the participants of the blockchain and reviews the event message to check to see if the first participant has sufficient currency that has not already been spent to provide for the transfer. The central authority transmits a response message to a blockchain node for use as input into the smart contract, which executes using the input to either facilitate the private blockchain transaction in the privacy group, if approved, or reject the transaction, if denied. As a result, the transaction can remain private and kept within the privacy group, but each participant is prohibited from double spending blockchain currency through use of the central authority and the smart contract in the privacy group.

A method for facilitating secure private transfers in a blockchain includes: receiving, by a receiver of a node in a blockchain network, an initiate message from a first computing device for a proposed private transfer, wherein the initiate message includes at least a private group identifier, an entity identifier, and a transfer amount; executing, by a processor of the node, a smart contract stored in a blockchain associated with the blockchain network using the received initiate message as input, wherein execution of the smart contract includes transmitting, by a transmitter of the node, an event message to a central authority system including at least the entity identifier and transfer amount; receiving, by the receiver of the node, a response message from the central authority system, wherein the response message includes an indication of approval or rejection of the proposed private transfer; and executing, by the processor of the node, the smart contract using the received response message as input, wherein execution of the smart contract includes (i) adding a private blockchain transaction to the blockchain for transfer of the transfer amount from a first blockchain wallet associated with the entity identifier to a second blockchain wallet in a private group associated with the private group identifier if the response message includes an indication of approval, or (ii) declining the proposed private transfer.

A system for facilitating secure private transfers in a blockchain includes: a blockchain network including a node and a plurality of additional blockchain nodes; a first computing device; and a central authority system, wherein the node includes a receiver receiving an initiate message from the first computing device for a proposed private transfer, wherein the initiate message includes at least a private group identifier, an entity identifier, and a transfer amount, and a processor executing a smart contract stored in a blockchain associated with the blockchain network using the received initiate message as input, wherein execution of the smart contract includes transmitting, by a transmitter of the node, an event message to the central authority system including at least the entity identifier and transfer amount, the receiver receiving a response message from the central authority system, wherein the response message includes an indication of approval or rejection of the proposed private transfer, and the processor executing the smart contract using the received response message as input, wherein execution of the smart contract includes (i) adding a private blockchain transaction to the blockchain for transfer of the transfer amount from a first blockchain wallet associated with the entity identifier to a second blockchain wallet in a private group associated with the private group identifier if the response message includes an indication of approval, or (ii) declining the proposed private transfer.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Facilitating Secure Private Transfers in a Blockchain

Figure 1:
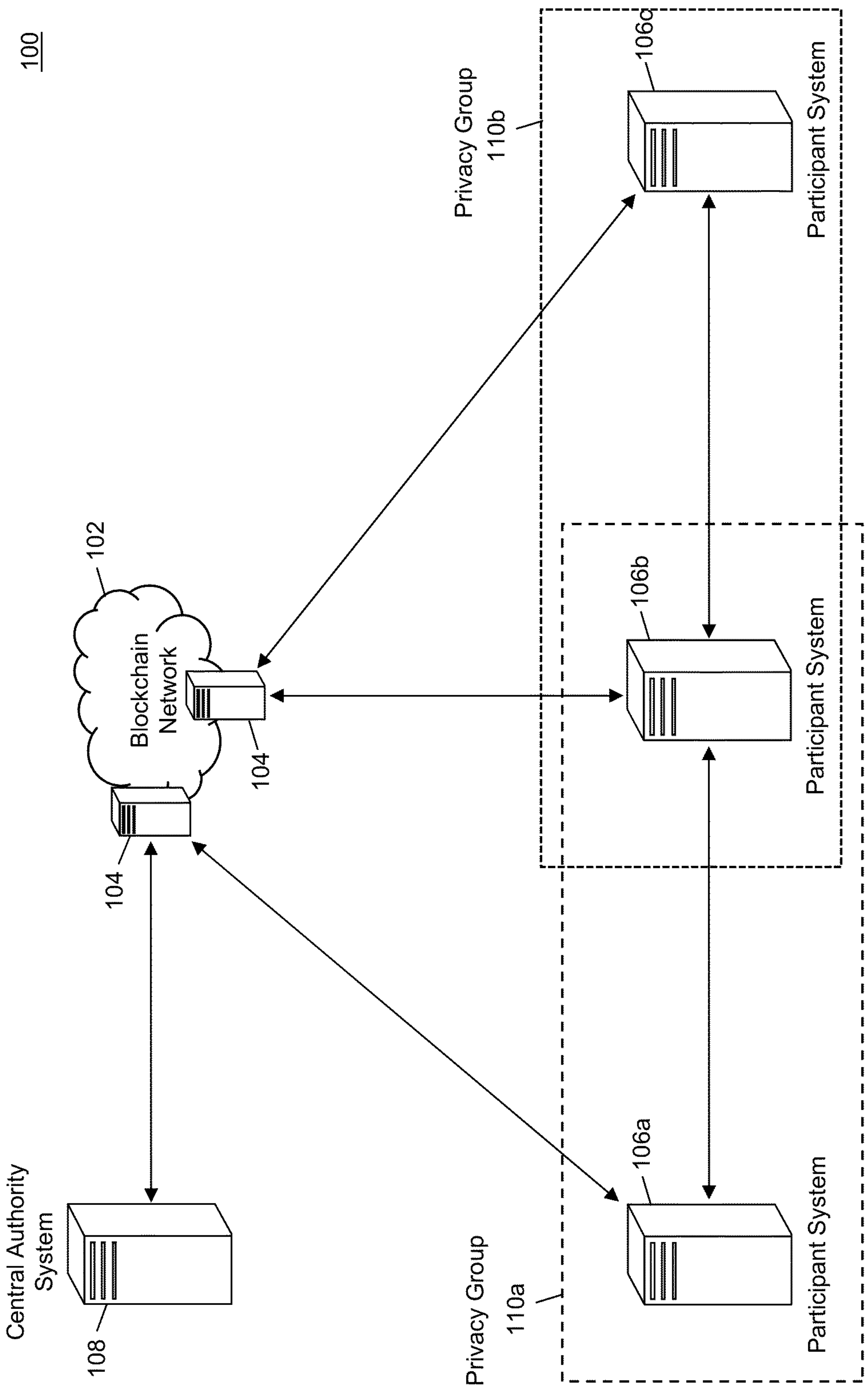
FIG. 1 is a block diagram illustrating a high-level system architecture for facilitating secure private transfers in a blockchain in accordance with exemplary embodiments.

FIG. 1 illustrates a system 100 that facilitates secure private transfers in a blockchain through the use of privacy groups, smart contracts, and a third-party authority.

Figure 2:
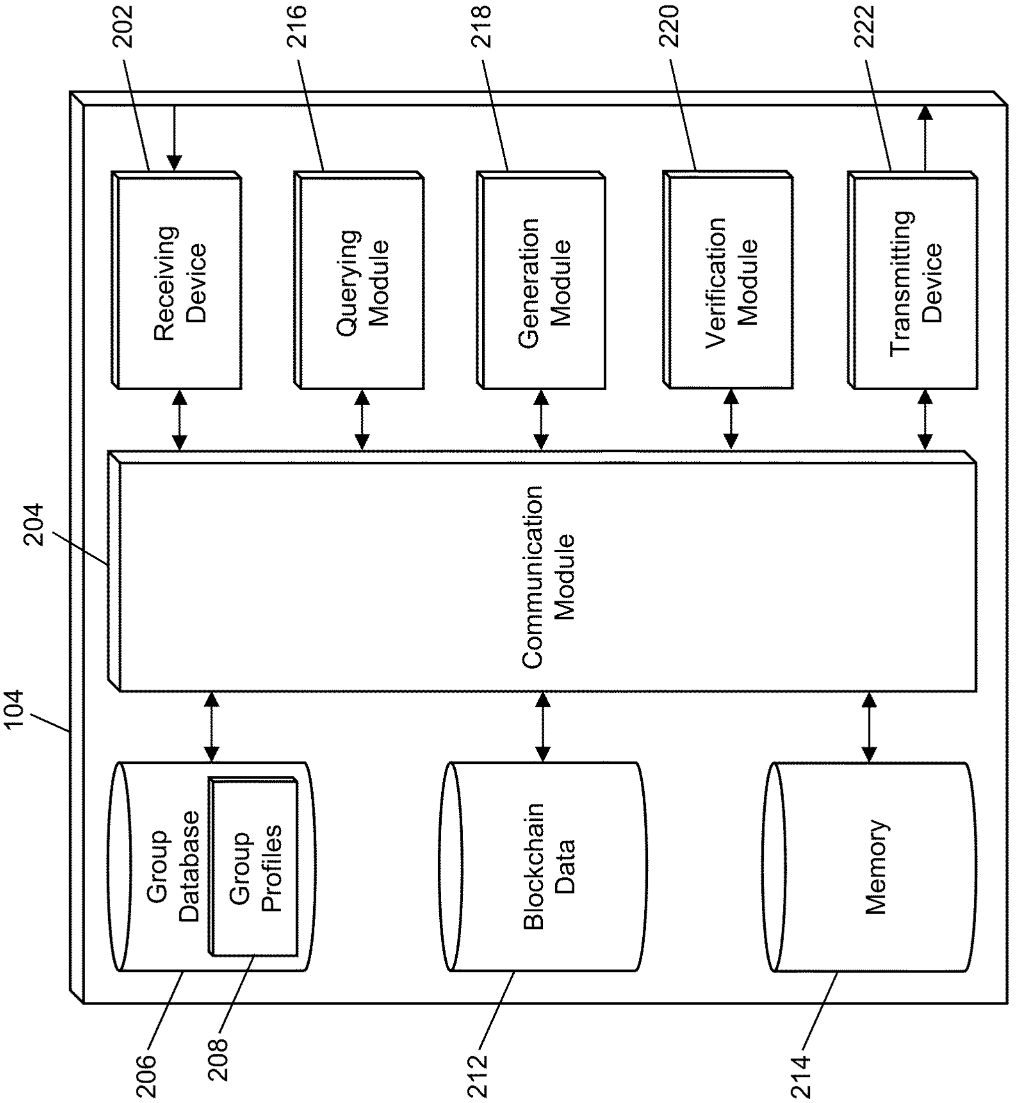
FIG. 2 is a block diagram illustrating a blockchain node for facilitating secure private transfers in a blockchain in the system of FIG. 1 in accordance with exemplary embodiments.
Figure 5:
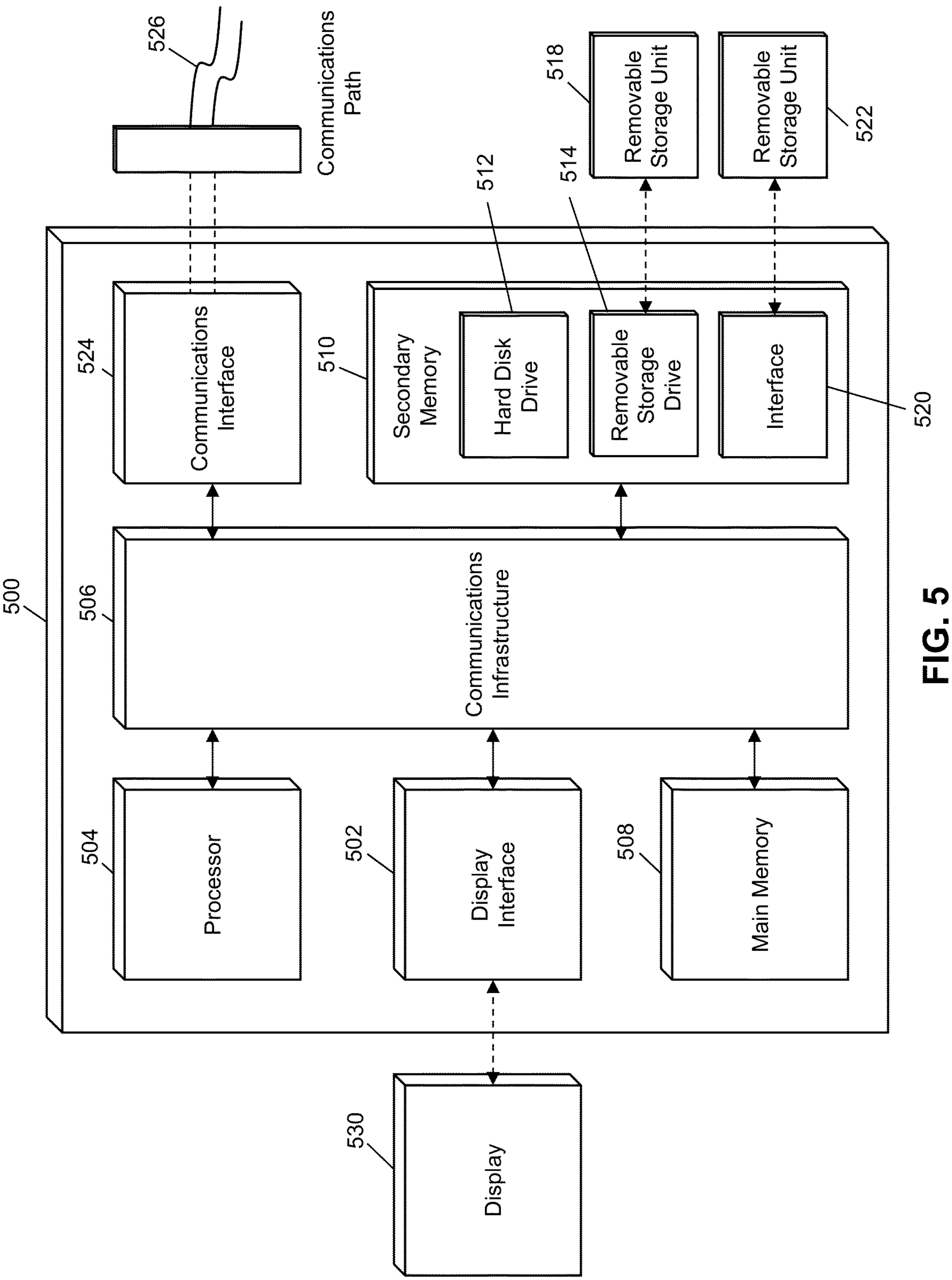
FIG. 5 is a block diagram illustrating a computer system architecture in accordance with exemplary embodiments.

The system 100 can include a blockchain network 102. The blockchain network 102 can be comprised of a plurality of blockchain nodes 104. Each blockchain node 104 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 104 in the blockchain network 102 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 102 using the public key of the cryptographic key pair. In some cases, the term "blockchain wallet" can refer specifically to the private key. In other cases, the term "blockchain wallet" can refer to a computing device (e.g., participant system 106, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a first participant system 106*a*) that is generated using the sender's private key, a blockchain address of the recipient of currency (e.g., a second participant system 106*b*) generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 104 in the blockchain network 102, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 102 before being added to the blockchain and distributed to all of the blockchain nodes 104 in the blockchain network 102, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be configured to store smart contracts. A smart contract can be a self-executable data object that is stored on the blockchain in a blockchain data value that executes once one or more criteria have been satisfied. The smart contract can monitor new blocks added to the blockchain until expected data is added to the blockchain that fulfills criteria or criteria is satisfied in another manner. Once the criteria is satisfied, the smart contract can self-execute and perform one or more actions related to the blockchain as a result, such as the submission of a new transaction for the transfer of digital currency or the submission of new data for storage in a new blockchain data value in the blockchain. In some cases, a single smart contract can execute multiple times, such as to perform different functions as a result of different inputs or other criteria.

In the system 100, the blockchain can include one or more privacy groups 110. A privacy group 110 can be a group of at least two participant systems 106 where transfers, smart contracts, or other blockchain data stored in the blockchain that are assigned to the privacy group 110 can only be viewed by members of that privacy group 110. In an example, a first privacy group 110*a* can include a first participant system 106*a* and a second participant system 106*b*. The privacy group 110*a* can be assigned a unique identifier that is unique to that privacy group 110*a* among all privacy groups 110 in the blockchain, referred to herein as a "group identifier," "privacy group identifier," or "private group identifier." A blockchain data entry in the blockchain can be associated with the privacy group 110*a* via inclusion of its privacy group identifier in the blockchain data entry.

Each blockchain node 104 in the blockchain network 102 can maintain a profile for each privacy group 110, or may use a central public directory service, that includes its privacy group identifier as well as an identifier (e.g., blockchain wallet public key, device identifier, serial number, or other unique value) for each participant system 106 in the group. When a participant system 106 requests blockchain data from a blockchain node 104, the blockchain node 104 can identify each privacy group 110 to which the participant system 106 belongs based on its provided identification information and the group profiles. The blockchain node 104 can then provide the participant system 106 with only the blockchain data that the participant system 106 is authorized to view. In other words, the participant system 106 can be provided with blockchain data entries that are public (e.g., not associated with a privacy group 110) and those blockchain data entries that include a privacy group identifier for a privacy group 110 to which the participant system 106 is a member.

The system 100 can further include a central authority system 108. The central authority system 108 can be an entity that is configured to maintain balances for each of the participant systems 106 and provide authorization for a new entity to participate in the blockchain network 102 as a participant system 106. More information about central authority systems 108, also referred to as "issuing authorities," can be found in U.S. patent application Ser. No. 16/576,915, entitled "Method and System for Distribution of a Consistent Ledger Across Multiple Blockchains," filed on Sep. 20, 2019, by Steven C. Davis et al., which is herein incorporated by reference in its entirety. The central authority system 108 can store a balance of blockchain currency for each participant system 106 in the system 100 and can update the balance each time the participant system 106 participates in a blockchain transaction, either public or private, in the blockchain network 102.

In order to facilitate private transfers on the blockchain while preventing double spend, a privacy group 110 can be created for every pair of participant systems 106 in the system 100. In other words, each time a new participant system 106, such as participant system 106*b*, is provided authorization to participate in the blockchain network 102 as a participant, a new privacy group 110 will be created for every existing participant system 106 (e.g., privacy group 110*b* for participant systems 106*b* and 106*c*) that includes the existing participant system 106 and the new participant system 106. As a result, the blockchain network 102 can always include, for a number n of participant systems 106, at least $$\frac{n(n-1)}{2}$$

privacy groups 110. In some cases, additional privacy groups 110 can be included that include more than two participant systems 106, such as may be desired by the participant systems 106. The creation of the group may be deferred until the group is required in a transfer, and inactive groups may be deleted Each privacy group 110 can have a smart contract associated therewith that is stored in the blockchain and only viewable and accessible by that privacy group 110 (e.g., where the smart contract is stored in a blockchain data entry that includes the privacy group identifier for the privacy group 110). The smart contract can be a single private smart contract that can be executed for every private transfer between participant systems 106 in the privacy group 110 or can be a private smart contract that is utilized for a single transfer in the privacy group 110 where a new private smart contract is added to the blockchain after each transfer to be utilized for a subsequent transfer.

When a first participant system 106, such as the participant system 106*a*, is interested in making a private transfer to another participant system 106, such as the participant system 106*b*, the first participant system 106*a* can submit an initiate message to a blockchain node 104 in the blockchain network 102. The initiate message can include at least the transfer amount of blockchain currency that is desired in the transfer, an entity identifier associated with the first participant system 106*a*, and one of: an entity identifier associated with the second participant system 106*b* or a group identifier associated with the privacy group 110*a* to which the first participant system 106*a* and second participant system 106*b* belong. The blockchain node 104 can receive the initiate message and identify the privacy group 110*a* and second participant system 106*b* using the group identifier and/or entity identifier, such as by using the data to identify a group profile and identifying the other data in the group profile.

The blockchain node 104 can identify the privacy group 110*a* and identify the private smart contract that is stored in the blockchain that is associated with the privacy group 110*a*, such as using the associated privacy group identifier. The initiate message can be provided as input for the smart contract, which can be executed. Execution of the smart contract can result in the generation of an event message that is electronically transmitted to the central authority system 108 using a suitable communication network and method. The event message can include at least the entity identifier associated with the first participant system 106*a* and the transfer amount for the proposed private transaction. In some embodiments, the event message can also include the entity identifier associated with the second participant system 106*b*.

The central authority system 108 can receive the event message and identify a profile associated with the first participant system 106*a* using the entity identifier associated therewith. The central authority system 108 can then determine if the participant system 106*a* has a sufficient balance to cover the transfer of the specified transfer amount to the second participant system 106*b*. In some cases, the initiate message can specify one or more unspent transaction outputs that are to be used to effect the transfer. In such cases, the unspent transaction outputs can be included in the event message, and the determination by the central authority system 108 can include determining if the unspent transaction outputs are associated with the participant system 106*a* and correspond to a sufficient amount of blockchain currency for the desired transfer amount.

The central authority system 108 can determine an approval or rejection for the proposed private transfer as a result of the determination. For example, if the participant system 106*a* does not provide suitable unspent transaction outputs or if the participant system 106*a* has already requested a private transfer for enough currency that would make the newly-proposed private transfer impossible, the central authority system 108 can reject the proposed private transfer. The central authority system 108 can generate a response message that is electronically transmitted to a blockchain node 104 in the blockchain network 102 that includes an indication as to whether the proposed private transfer is to be approved or rejected. In some cases, the response message can include additional information for use in identifying the proposed private transfer, such as the entity identifier associated with the participant system 106*a* and the group identifier associated with the privacy group 110*a* or a session identifier or other value that is unique to the proposed private transfer, such as can be generated and provided by the first participant system 106*a* or the blockchain node 104.

The blockchain node 104 can receive the response message and can provide the response message as input to the private smart contract in the privacy group 110*a*. The private smart contract can then self-execute and perform an action based on the response message. If the response message indicates that the proposed private transfer is rejected, then the action can be to discard the initiate message and electronically transmit a notification message to the participant system 106*a* indicating that the proposed private transfer was rejected. In some cases, the notification message can include a reason for the rejection, which can be provided by the central authority system 108 in the response message and included in the notification message during execution of the smart contract. If the response message indicates that the proposed private transfer is accepted, then the private transfer can be added to the blockchain. The addition of the private transfer to the blockchain can include generation of a new blockchain transaction by the smart contract that can include, for example, a digital signature for the participant system 106*a* (e.g., included in the initiate message, included in the smart contract, generated by the smart contract, etc.), one or more unspent transaction outputs, a destination address associated with the participant system 106*b*, and the transfer amount. In some cases, the amount of data included in the private transfer can be dependent on the architecture of the blockchain and needs of the participant systems 106 and/or the central authority system 108. The new blockchain transaction can be included in a new blockchain data entry that also includes the privacy group identifier for the privacy group 110*a* that is verified and included in a new block that is verified and added to the blockchain.

In some embodiments, execution of the smart contract can further result in the generation of a notification message that is electronically transmitted to the central authority system 108 that notifies the central authority system 108 of the successful addition of the private transfer to the blockchain. In some cases, the notification message can include information identifying the private transfer, such as the session identifier or other data. In some instances, the notification message can include a transaction identifier or other data stored in the blockchain data entry, can include the blockchain data entry itself, or other data such as can be required or requested by the central authority system 108. The central authority system 108 can then update profiles for both the first participant system 106*a* and the second participant system 106*b* to update their available blockchain currency balances, unspent transaction outputs, and/or other data for use in making future determinations for proposed private transfers involving the first participant system 106*a* or the second participant system 106*b*.

The systems and methods discussed herein thus facilitate private transfers on a blockchain while eliminating the possibility of double spend. By using smart contracts, the private transfers can be conducted without any additional actions being performed by participant systems 106 or blockchain nodes 104, enabling the methods and systems discussed herein to be implemented with minimal disruption to existing practices. Use of the central authority system 108 to provide authorization for each private transfer ensures that no participant system 106 can double spend any blockchain currency or take other unauthorized action that could go unnoticed in a traditional blockchain network 102 that utilizes privacy groups 110. As a result, every participant system 106 can avail themselves of private transfers on the blockchain without exposing themselves to risk of fraud by other participant systems 106, providing a significant improvement over existing systems.

Blockchain Node

FIG. 2 illustrates an embodiment of a blockchain node 104. It will be apparent to persons having skill in the relevant art that the embodiment of the blockchain node 104 illustrated in FIG. 2 is provided as illustration only and cannot be exhaustive to all possible configurations of the blockchain node 104 suitable for performing the functions as discussed herein. For example, the computer system 500 illustrated in FIG. 5 and discussed in more detail below can be a suitable configuration of the blockchain node 104. In some cases, additional components of the system 100, such as the participant system 106 and central authority system 108, can include the components illustrated in FIG. 2 and discussed below.

The blockchain node 104 can include a receiving device 202. The receiving device 202 can be configured to receive data over one or more networks via one or more network protocols. In some instances, the receiving device 202 can be configured to receive data from other blockchain nodes 104, participant systems 106, central authority systems 108, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by other blockchain nodes 104 that can be superimposed or otherwise encoded with blocks, blockchain data values, confirmation messages, cryptographic keys, smart contracts, entity identifiers, privacy group identifiers, etc. The receiving device 202 can also be configured to receive data signals electronically transmitted by participant systems 106 that are superimposed or otherwise encoded with initiate messages, entity identifiers, blockchain wallet data, privacy group data, etc. The receiving device 202 can be further configured to receive data signals electronically transmitted by central authority systems 108 that can be superimposed or otherwise encoded with response messages, requests for notification messages, requests for blockchain data, entity identifiers, event data, privacy group data, etc.

The blockchain node 104 can also include a communication module 204. The communication module 204 can be configured to transmit data between modules, engines, databases, memories, and other components of the blockchain node 104 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the blockchain node 104 and external components of the blockchain node 104, such as externally connected databases, display devices, input devices, etc. The blockchain node 104 can also include a processing device. The processing device can be configured to perform the functions of the blockchain node 104 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, verification module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The blockchain node 104 can include a group database 206. The group database 206 can be configured to store a plurality of group profiles 208 using a suitable data storage format and schema. The group database 206 can be a relational database that utilizes structured query language for the storage, identification, modifying, updating, accessing, etc. of structured data sets stored therein. Each group profile 208 can be a structured data set configured to store data related to a privacy group 110. A group profile 208 can include, for example, a privacy group identifier and, for each participant system 106 that is in the associated privacy group 110, an entity identifier. In some cases, a group profile 208 can further include private smart contract data, blockchain wallet data for each participant system 106 in the associated privacy group 110, etc.

The blockchain node 104 may also include blockchain data 212, which may be stored in the memory 214 of the blockchain node 104 or stored in a separate area within the blockchain node 104 or accessible thereby. The blockchain data 212 may include a blockchain, which may be comprised of a plurality of blocks and be associated with the blockchain network 102. In some cases, the blockchain data 212 may further include any other data associated with the blockchain and management and performance thereof, such as block generation algorithms, digital signature generation and confirmation algorithms, communication data for blockchain nodes 104, smart contracts, etc.

The blockchain node 104 can also include a memory 214. The memory 214 can be configured to store data for use by the blockchain node 104 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the blockchain node 104 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, signature generation algorithms, smart contract data, etc.

The blockchain node 104 can include a querying module 216. The querying module 216 can be configured to execute queries on databases to identify information. The querying module 216 can receive one or more data values or query strings and can execute a query string based thereon on an indicated database, such as the group database 206 of the blockchain node 104 to identify information stored therein. The querying module 216 can then output the identified information to an appropriate engine or module of the blockchain node 104 as necessary. The querying module 216 can, for example, execute a query on the group database 206 to identify a group profile 208 corresponding to a received initiate message to identify a privacy group identifier and/or entity identifier(s) included therein for submission in a private smart contract.

The blockchain node 104 can also include a generation module 218. The generation module 218 can be configured to generate data for use by the blockchain node 104 in performing the functions discussed herein. The generation module 218 can receive instructions as input, can generate data based on the instructions, and can output the generated data to one or more modules of the blockchain node 104. For example, the generation module 218 can be configured to generate blockchain data entries, blocks, confirmation messages, cryptographic key pairs, digital signatures, functions and instructions for performing actions, smart contracts, smart contract submission data, event messages, notification messages, session identifiers, etc.

The blockchain node 104 can also include a verification module 220. The verification module 220 can be configured to perform verifications for the blockchain node 104 as part of the functions discussed herein. The verification module 220 can receive instructions as input, which can also include data to be used in performing a verification, can perform a verification as requested, and can output a result of the verification to another module or engine of the blockchain node 104. The verification module 220 can, for example, be configured to verification digital signatures using suitable signature generation algorithms and keys, verify smart contract data, verify new blockchain transactions, etc.

The blockchain node 104 can also include a transmitting device 222. The transmitting device 222 can be configured to transmit data over one or more networks via one or more network protocols. In some instances, the transmitting device 222 can be configured to transmit data to other blockchain nodes 104, participant systems 106, central authority systems 108, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to other blockchain nodes 104 that can be superimposed or otherwise encoded with blockchain data values, blocks, confirmation messages, requests for blockchain data, smart contract data, entity identifiers, privacy group identifiers, group profiles 208, etc. The transmitting device 222 can also be configured to electronically transmit data signals to participant systems 106 that can be superimposed or otherwise encoded with requests for entity identifiers, requests for blockchain wallet data, blockchain data, notification messages, etc. The transmitting device 222 can be further configured to electronically transmit data signals to central authority systems 108, which can be superimposed or otherwise encoded with event messages, notification messages, entity identifiers, privacy group identifiers, group profile 208 data, etc.

Process for Facilitating a Private Transfer in a Blockchain

Figure 3:
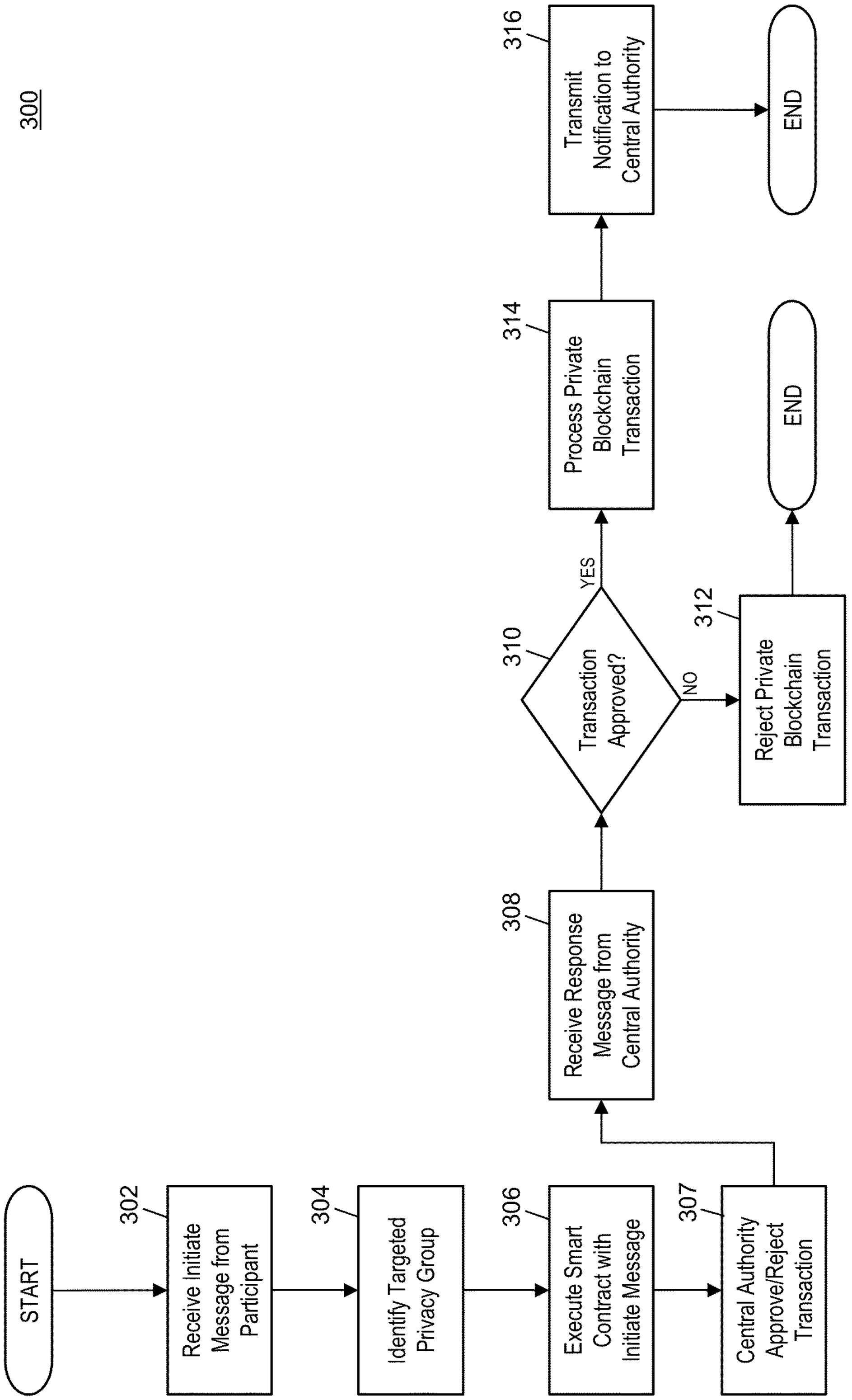
FIG. 3 is a flow diagram illustrating a process for facilitating secure private transfers in a blockchain by the blockchain node in the system of FIG. 1 in accordance with exemplary embodiments.

FIG. 3 illustrates a process 300 for facilitating a private transfer in a blockchain that is protected against double spend as executed by the blockchain node 104 of the system 100 of FIG. 1 and of FIG. 2.

In step 302, the receiving device 202 of the blockchain node 104 can receive an initiate message for a proposed private transfer transmitted from a first participant system **106*a* using a suitable communication network and method. The initiate message can include at least an entity identifier associated with the first participant system 106*a*, a transfer amount for the proposed private transfer, and at least one of: an entity identifier associated with the second participant system 106*b* to which the proposed private transfer is intended, and a group identifier associated with the privacy group 110*a* that includes the first participant system 106*a* and the second participant system 106*b*. In some cases, the initiate message can further include one or more unspent transaction outputs, a digital signature, and/or any additional data necessary for the generation and verification of the proposed private transfer. In step 304, the querying module 216 of the blockchain node 104 can execute a query on the group database 206 of the blockchain node 104 to identify a group profile 208 that includes the entity identifier associated with the targeted privacy group 110, e.g., the first participant system 106*a* and the other data included in the initiate message (e.g., the entity identifier associated with the second participant system 106*b*** or the group identifier).

In step 306, the blockchain node 104 can input the initiate message and any additional data located in the identified group profile 208 as necessary into a private smart contract stored in the blockchain that is associated with the privacy group **110*a*. Inputting the data into the smart contract can result in execution thereof, which can result in the transmission of an event message to the central authority system 108. The event message can include at least the entity identifier associated with the first participant system 106*a* and the transfer amount. In cases where the initiate message includes one or more unspent transaction outputs and/or other data for the proposed private transfer, the event message can further include such additional data. In step 307, the central authority system 108 can determine if the proposed private transfer is approved or rejected, such as based on a blockchain currency balance for the first participant system 106*a* that can be tracked by the central authority system 108. In step 308, the central authority system 108 can electronically transmit a response message to the blockchain node 104 that indicates approval or rejection of the proposed private transfer, which can be received by the receiving device 202 of the blockchain node 104**.

In step 310, the blockchain node 104 can input the response message into the private smart contract. The private smart contract can be executed as a result, where the execution can include a reading of the data included in the response message. If the response message indicates that the proposed private transfer is rejected, then, in step 312, the proposed private transfer can be rejected by the blockchain node 104 as a result of the execution of the smart contract. Rejection of the proposed private transfer can result in discarding of the initiate message and any other associated data by the blockchain node 104. In some cases, the transmitting device 222 of the blockchain node 104 can electronically transmit a notification message to the first participant system 106*a*, which can indicate that the proposed private transfer was rejected. In instances where the central authority system 108 includes an indication of a reason for the rejection in the response message, the notification message electronically transmitted to the first participant system 106*a* can include the indication of the reason.

If, in step 310, the smart contract determines that the proposed private transfer is accepted based on the response message, then, in step 314, the proposed private transfer can be processed by adding a new blockchain transaction to the blockchain for the private transfer. The new blockchain transaction can be generated by the smart contract using data included therein as well as input into the smart contract using the initiate message and/or the response message. The new blockchain transaction can be transmitted to the blockchain node 104 (e.g., received via the receiving device 202 or through internal communications, such as via the communication module 204), where the generation module 218 of the blockchain node 104 can generate a blockchain data entry that includes the new blockchain transaction and the group identifier for the privacy group 110*a*, can generate a new block that includes the new blockchain data entry, and can distribute the new block to a plurality of other blockchain nodes 104 in the blockchain network 102 for verification and confirmation thereof for addition to the blockchain. In step 316, the transmitting device 222 of the blockchain node 104 can electronically transmit a notification message to the central authority system 108 that includes an indication of the addition of the private transfer to the blockchain. The central authority system 108 can, based on the notification message, update data associated with the first participant system 106*a* and the second participant system 106*b*, such as to update the balances of blockchain currency associated therewith based on the transfer.

Exemplary Method for Facilitating Secure Private Transfers in a Blockchain

Figure 4:
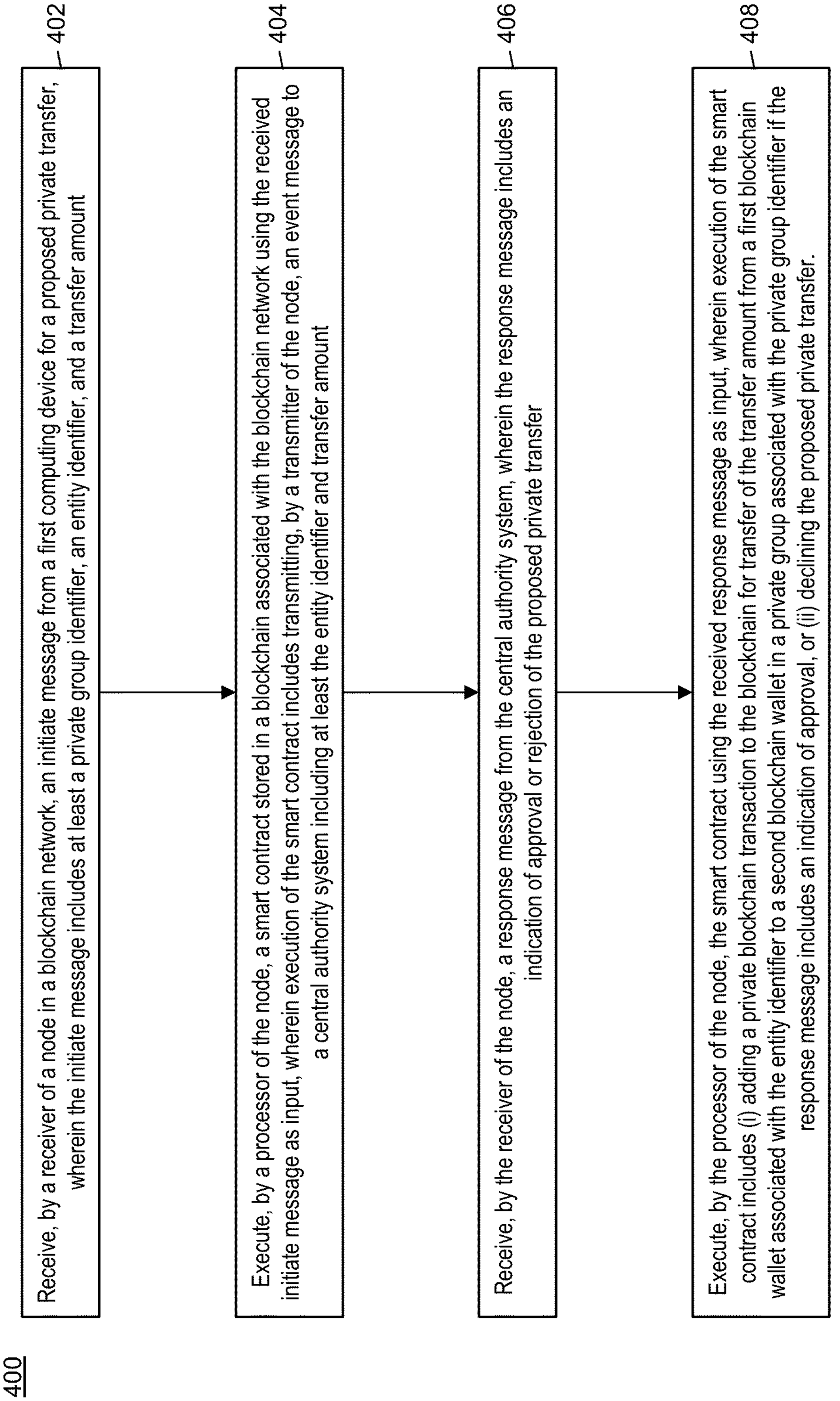
FIG. 4 is a flow chart illustrating an exemplary method for facilitating secure private transfers in a blockchain in accordance with exemplary embodiments.

FIG. 4 illustrates a method 400 for facilitating secure private transfers in a blockchain using a central authority and smart contracts to enable privacy while preventing double spending of blockchain currency.

In step 402, an initiate message can be received by a receiver (e.g., receiving device 202) of a node (e.g., blockchain node 104) in a blockchain network (e.g., blockchain network 102) from a first computing device (e.g., first participant system 106*a*) for a proposed private transfer, wherein the initiate message includes at least a private group identifier, an entity identifier, and a transfer amount. In step 404, a smart contract stored in a blockchain associated with the blockchain network can be executed by a processor of the node using the received initiate message as input, wherein execution of the smart contract includes transmitting, by a transmitter (e.g., transmitting device 222) of the node, an event message to a central authority system (e.g., central authority system 108) including at least the entity identifier and transfer amount.

In step 406, a response message can be received by the receiver of the node from the central authority system, wherein the response message includes an indication of approval or rejection of the proposed private transfer. In step 408, the smart contract can be executed by the processor of the node using the received response message as input, wherein execution of the smart contract includes (i) adding a private blockchain transaction to the blockchain for transfer of the transfer amount from a first blockchain wallet associated with the entity identifier to a second blockchain wallet in a private group associated with the private group identifier if the response message includes an indication of approval, or (ii) declining the proposed private transfer.

In one embodiment, the smart contract can be stored in a blockchain data entry in the blockchain that further includes the private group identifier. In some embodiments, the method 400 can further include: receiving, by a receiver (e.g., receiving device 202) of the central authority system, the event message; identifying, by a processor (e.g., querying module 216) of the central authority system, blockchain wallet data associated with the entity identifier; determining, by the processor (e.g., generation module 218) of the central authority system, approval or rejection of the proposed private transfer based on at least the blockchain wallet data and the transfer amount; generating, by the processor (e.g., generation module 218) of the central authority system, the response message including the indication of approval or rejection based on the determination; and transmitting, by a transmitter (e.g., transmitting device 222) of the central authority system, the generated response message to the node. In one embodiment, the method 400 may further include transmitting, by the transmitter of the node, a notification message to the central authority including a notification of successful addition of the private blockchain transaction if the response message includes an indication of approval.

In some embodiments, the method 400 can further include: receiving, by a receiver of the central authority system, a notification message from the node, wherein the notification message includes a notification of successful addition of the private blockchain transaction if the response message includes an indication of approval; and updating, by a processor of the central authority system, blockchain wallet data associated with the entity identifier based on at least the transfer amount included in the event message. In one embodiment, the method 400 may further include: storing, in a memory (e.g., group database 206, memory 214, etc.) of the node, a plurality of privacy group profiles (e.g., group profiles 208), wherein each privacy group profile includes at least a group identifier and two entity identifiers; identifying, by the processor (e.g., querying module 216) of the node, a specific privacy group profile of the plurality of privacy group profiles wherein the included group identifier matches the private group identifier included in the initiate message, wherein the second blockchain wallet is associated with a first of the two entity identifiers included in the specific privacy group profile, wherein a second of the two entity identifiers matches the entity identifier included in the initiate message. In a further embodiment, the private group can be associated with the specific privacy group profile. In some embodiments, the private blockchain transaction can be stored in a blockchain data entry in the blockchain that includes the private group identifier.

Computer System Architecture

FIG. 5 illustrates a computer system 500 in which embodiments of the present disclosure, or portions thereof, can be implemented as computer-readable code. For example, the blockchain nodes 104 of FIGS. 1 and 2 and the participant systems 106 and central authority system 108 of FIG. 1 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating secure private transfers in a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for facilitating secure private transfers in a blockchain, comprising:

receiving, by a receiver of a node in a blockchain network, an initiate message from a first computing device associated with a first participant system for a proposed private transfer between the first participant system and a second participant system, wherein the initiate message includes (i) an entity identifier associated with the first participant system, (ii) a transfer amount, and (iii) a private group identifier associated with a privacy group to which the first participant system and the second participant system belong;

identifying, by a processor of the node, a smart contract stored in the blockchain, using the private group identifier included in the received initiate message, said smart contract being associated with the privacy group;

executing, by the processor of the node, the smart contract using the received initiate message as input, wherein execution of the smart contract includes transmitting, by a transmitter of the node, an event message to an external central authority system including an entity identifier associated with the first participant system and transfer amount, said central authority system maintaining balances for each participant system and providing authorization for a new entity to participate in the blockchain network as a participant system;

receiving, by the receiver of the node, a response message from the central authority system, wherein the response message includes an indication of approval or rejection of the proposed private transfer; and executing, by the processor of the node, the smart contract using the received response message as input, wherein execution of the smart contract includes (i) adding a private blockchain transaction to the blockchain for transfer of the transfer amount from a first blockchain wallet associated with the entity identifier to a second blockchain wallet in the privacy group associated with the private group identifier if the proposed private transfer is approved, or (ii) declining the proposed private transfer.

2. The method of claim 1, wherein the smart contract is stored in a blockchain data entry in the blockchain that further includes the private group identifier.

3. The method of claim 1, further comprising:

receiving, by a receiver of the central authority system, the event message;

identifying, by a processor of the central authority system, blockchain wallet data associated with the entity identifier;

determining, by the processor of the central authority system, approval or rejection of the proposed private transfer based on at least the blockchain wallet data and the transfer amount;

generating, by the processor of the central authority system, a response message including an indication of approval or rejection based on the determination; and transmitting, by a transmitter of the central authority system, the generated response message to the node.

4. The method of claim 3, further comprising:

transmitting, by the transmitter of the node, a notification message to the central authority including a notification of successful addition of the private blockchain transaction if the response message includes an indication of approval.

5. The method of claim 1, further comprising:

receiving, by a receiver of the central authority system, a notification message from the node, wherein the notification message includes a notification of successful addition of the private blockchain transaction if the response message includes an indication of approval; and updating, by a processor of the central authority system, blockchain wallet data associated with the entity identifier based on at least the transfer amount included in the event message.

6. The method of claim 1, further comprising:

identifying, by the processor of the node, a specific privacy group profile of a plurality of privacy group profiles wherein a group identifier included therein matches the private group identifier included in the initiate message, wherein the second blockchain wallet is associated with a first of the two entity identifiers included in the specific privacy group profile, wherein a second of the two entity identifiers matches the entity identifier included in the initiate message.

7. The method of claim 6, wherein the private group is associated with the specific privacy group profile.

8. The method of claim 1, wherein the private blockchain transaction is stored in a blockchain data entry in the blockchain that includes the private group identifier.

9. A system for facilitating secure private transfers in a blockchain, comprising:

a blockchain network including a node and a plurality of additional blockchain nodes;

a first computing device associated with a first participant system; and a central authority system that is external to the blockchain network, wherein the node includes a processor and a memory storing instructions thereon that, when executed by the processor, cause the processor to:

receive an initiate message from the first computing device for a proposed private transfer between the first participant system and a second participant system, wherein the initiate message includes (i) an entity identifier associated with the first participant system, (ii) a transfer amount, and (iii) a private group identifier associated with a privacy group to which the first participant system and the second participant system belong, identify a smart contract stored in the blockchain using the private group identifier included in the received initiate message, said smart contract being associated with the privacy group, execute a smart contract using the received initiate message as input, wherein execution of the smart contract includes transmitting an event message to the central authority system including the entity identifier associated with the first participant system and transfer amount, said central authority system maintaining balances for each participant system and providing authorization for a new entity to participate in the blockchain network as a participant system, receive a response message from the central authority system, wherein the response message includes an indication of approval or rejection of the proposed private transfer; and execute the smart contract using the received response message as input, wherein execution of the smart contract includes (i) adding a private blockchain transaction to the blockchain for transfer of the transfer amount from a first blockchain wallet associated with the entity identifier to a second blockchain wallet in the privacy group associated with the private group identifier if the proposed private transfer is approved, or (ii) declining the proposed private transfer.

10. The system of claim 9, wherein the smart contract is stored in a blockchain data entry in the blockchain that further includes the private group identifier.

11. The system of claim 9, wherein the central authority system includes a processor and a memory, said memory storing instructions thereon that, when executed by the processor, cause the processor to:

receive the event message, identify blockchain wallet data associated with the entity identifier, determine approval or rejection of the proposed private transfer based on at least the blockchain wallet data and the transfer amount, and generate a response message including an indication of approval or rejection based on the determination; and transmit the generated response message to the node.

12. The system of claim 11, wherein the transmitter of the node transmits a notification message to the central authority including a notification of successful addition of the private blockchain transaction if the response message includes an indication of approval.

13. The system of claim 9, wherein the central authority system includes a receiver receiving a notification message from the node, wherein the notification message includes a notification of successful addition of the private blockchain transaction if the response message includes an indication of approval, and a processor updating blockchain wallet data associated with the entity identifier based on at least the transfer amount included in the event message.

14. The system of claim 9, wherein the processor of the node identifies a specific privacy group profile of a plurality of privacy group profiles wherein a group identifier included therein matches the private group identifier included in the initiate message, and the second blockchain wallet is associated with a first of the two entity identifiers included in the specific privacy group profile, wherein a second of the two entity identifiers matches the entity identifier included in the initiate message.

15. The system of claim 14, wherein the private group is associated with the specific privacy group profile.

16. The system of claim 9, wherein the private blockchain transaction is stored in a blockchain data entry in the blockchain that includes the private group identifier.

* * * * *